US008285428B2

(12) United States Patent
Hiale-Guilhamou et al.

(10) Patent No.: US 8,285,428 B2
(45) Date of Patent: Oct. 9, 2012

(54) SUPPORT METHOD AND DEVICE FOR ASSISTING IN THE PREPARATION AND MANAGEMENT OF MISSIONS IN AIRCRAFT

(75) Inventors: Mathieu Hiale-Guilhamou, Saint-Jory (FR); Daniel Ferro, Muret (FR)

(73) Assignee: Airbus Operations SAS, Toulouse (FR)

( * ) Notice: Subject to any disclaimer, the term of this patent is extended or adjusted under 35 U.S.C. 154(b) by 492 days.

(21) Appl. No.: 12/541,416

(22) Filed: Aug. 14, 2009

(65) Prior Publication Data

US 2010/0049380 A1 Feb. 25, 2010

(51) Int. Cl.
*G05D 1/00* (2006.01)

(52) U.S. Cl. ............... 701/3; 701/14; 701/411; 701/420

(58) Field of Classification Search .......... 701/200–213, 701/3, 10, 11, 14, 408–411, 420, 431, 454; 340/995.12–995.23
See application file for complete search history.

(56) References Cited

U.S. PATENT DOCUMENTS 6,134,500 A 10/2000 Tang et al.
7,228,207 B2 * 6/2007 Clarke et al. ...................... 701/3
7,957,987 B2 * 6/2011 Langerman ....................... 705/5

FOREIGN PATENT DOCUMENTS

DE 20 2006 005 089 U1 8/2006
EP 1 496 461 A1 1/2005
EP 1 947 624 A1 7/2008
FR 2 906 048 3/2008
WO WO 2004/102505 A2 11/2004

OTHER PUBLICATIONS

U.S. Appl. No. 12/538,364, filed Aug. 10, 2009, Hiale-Guilhamou, et al.

* cited by examiner

*Primary Examiner* — Richard M. Camby
(74) *Attorney, Agent, or Firm* — Oblon, Spivak, McClelland, Maier & Neustadt, L.L.P.

(57) ABSTRACT

A method and a device for an operating center for aiding in the preparation and management of missions of an aircraft. After a plurality of digital data has been received, the plurality of data comprising at least one datum of avionic type and one datum of open-world type, at least one flight plan is prepared from the plurality of data. The at least one prepared flight plan and the at least one datum of open-world type then are formatted. The formatted data in the form of an electronic document usable directly by a computer system of the aircraft are transmitted to the aircraft.

10 Claims, 5 Drawing Sheets

SUPPORT METHOD AND DEVICE FOR ASSISTING IN THE PREPARATION AND MANAGEMENT OF MISSIONS IN AIRCRAFT

BACKGROUND OF THE INVENTION

This invention relates to the preparation of flights carried out by aircraft and more particularly a method and a support device for aiding in the preparation and management of missions carried out by aircraft.

Preparation of a flight in order to set up a flight plan in its entirety is an essential task for an aircraft pilot in order to ensure operation of the aircraft in complete safety. Preparation of a flight takes into consideration several aspects such as the characteristics of the aircraft, the route taken, the goods and persons transported as well as the flight conditions, in particular the meteorological parameters.

Thus, for example, the quantity of fuel and the minimum and maximum takeoff and landing distances are calculated in particular according to the scheduled flight, the load of the aircraft, and meteorological conditions. It sometimes happens that it is necessary to modify the flight plan when an event, such as the closing of an airport because of bad weather, takes place. It then is the responsibility of the pilot to adjust the parameters used.

Preparation of a flight generally is the responsibility of the pilot. However, if up until recently the latter prepared his flights himself, he is increasingly aided by a team on the ground and by increasingly computerized tools.

In practice, the flight plans generally are prepared in advance, for example several days prior to the scheduled date of the flight. The flight plans here can be documents filled out beforehand by the operating center comprising in particular the dates of departure and arrival, the point of departure and the destination, the estimated flight time, the list of airports that can be used in the event of bad weather, the type of flight, the name of the pilot, the number of passengers, meteorological information items of the TAF (acronym for Terminal Aerodrome Forecast in English terminology) or METAR (acronym for METeorological Airport Report in English terminology) type, and aeronautical information items of the NOTAM (acronym for Notice To Air Men in English terminology) type. These information items are supplemented when new data are available.

Furthermore, for commercial missions, the preparation of flights takes into consideration parameters determined according to the strategy of the airline company operating the aircraft, such as fuel consumption and wear and tear on the engines. Although these parameters are not directly linked to the flights, they influence the preparation for them.

Certain parameters determined during preparation of the missions are input into the avionics. Such parameters are, for example, mass and navigation indications such as course points, called waypoints in English terminology. Others, intended for the pilot, are essentially informative. They are displayed on separate information systems of the avionics.

The documents put together during preparation of the missions generally are electronic documents, grouped in an application called EFF (abbreviation for Electronic Flight Folder in English terminology). They are transmitted to the aircraft, directly or via a memory medium such as a USB (abbreviation for Universal Serial Bus in English terminology) key. These documents are typically of the image type, that is, the data presented cannot be used directly by a computer system.

For reasons of safety, the avionics and the data processing operating systems contained in the EFF, called OIS (abbreviation for On-board Information System in English terminology), generally are physically separate, connected by a diode allowing only the transfer of data from the avionics to the data processing operating systems. The documents put together during preparation for the mission are transmitted to the OIS. The OIS belongs to the so-called “open” world, as distinguished from the avionic world, because of the origin of the processed data.

Thus, after having validated the parameters of the mission, if need be with tools working on the EFF, the pilot must input them manually into the avionics.

FIG. 1 schematically illustrates the preparation of a mission for an aircraft. The airline company operating the aircraft 100 here has an operating center 105 comprising a database 110 relating to the strategy of the airline company, a database 115 in which the parameters of the operated aircraft are stored and a database 120 in which the parameters of the planned flight, in particular the number of passengers, the freight mass and the destinations, are stored. These databases are connected to a processing system such as a computer, a server or a set of computers or servers, generically referenced 125, for aiding in the preparation of the missions.

The processing system 125 also is connected to external databases 130, for example databases comprising meteorological information items and specific flight conditions such as zones from time to time reserved for the military or problems affecting airports, in their entirety or in part.

After having been determined, the parameters of a mission are transmitted to the corresponding aircraft 100, directly or via a medium, here a USB key 135. These parameters generally are displayed on a screen 140 of the OIS to be reviewed by the pilot. Some of these parameters can be recopied by the pilot, with or without modification, into the avionics 145, called ACS (abbreviation for Aircraft Control System in English terminology). Because of the nature of the mission documents transmitted and the absence of a link between the OIS and the ACS, these parameters are recopied manually.

When a change is to be made shortly before takeoff, for example for reasons of unavailability of the takeoff runway or specific meteorological conditions, the operating center adapts the parameters of the mission and transmits them to the pilot, in the form of electronic documents or by radio, so as to allow him to take them into consideration in order to modify the avionic parameters, if necessary.

Even if the preparation of missions is satisfactory nowadays in terms of quality, it requires a significant ground time for the aircraft, which entails an operating loss. Furthermore, the existing systems do not make it possible to easily update, on the ground or in flight, the mission parameters taking the criteria of the airline company into consideration. In particular, data-entry errors are frequent and sometimes can impair the safety of the aircraft. Thus, for example, a faulty entry of the mass of an aircraft leads to a faulty calculation of takeoff speed.

Thus there exists a need to improve the preparation and the management of missions, in particular in order to reduce the ground time of the aircraft and to improve the process of modification of the parameters used.

SUMMARY OF THE INVENTION

The invention makes it possible to resolve at least one of the problems set forth above.

The invention thus has as its object a method for an operating center for aiding in the preparation and management of missions of an aircraft, this method comprising the following steps, receiving a plurality of digital data, the said plurality of data comprising at least one datum of avionic type and one datum of open-world type;

preparing at least one flight plan from the said plurality of data;

formatting the said at least one prepared flight plan and the said at least one datum of open-world type, the formatted data being an electronic document usable directly by a computer system of the said aircraft; and, transmitting the said formatted data to the said aircraft.

The method according to the invention makes it possible for the airline companies to have tools for preparing batches of mission-oriented data comprising in particular criteria of the airline companies. The transmitted data are formatted so as to be usable directly by the avionics in order to avoid data reentry operations by the pilot. In this way the method according to the invention makes it possible to reduce the preparation time between two consecutive flights, the time spent by the crew in preparing the flight as well as the workload of the pilot and consequently the risk of error.

According to a particular embodiment, the method further comprises a step of receiving at least one datum from the said aircraft, the said at least one received datum being used to prepare the said at least one flight plan. The transmitted data thus can be adapted to the configuration of the systems of the aircraft or to some of its parameters in order to reduce the quantity of data exchanged between the operating center and the aircraft.

Again according to a particular embodiment, a plurality of flight plans is prepared prior to the said step of transmitting the formatted data, each flight plan of the said plurality of flight plans corresponding to a different mission of the said aircraft, the said step of formatting comprising the formatting of the said plurality of flight plans. In this way, the method according to the invention makes it possible to transmit simultaneously data relating to several missions.

Again according to a particular embodiment, a plurality of flight plans is prepared prior to the said step of transmitting the formatted data, at least two flight plans of the said plurality of flight plans corresponding to the same mission of the said aircraft, at least one of the said at least two flight plans corresponding to the same mission of the said aircraft being formatted and transmitted to the said aircraft. In this way, the method according to the invention makes it possible to determine data relating to the same mission by taking several hypotheses into consideration in order to allow a rapid transmission of the data relating to the mission for each of these hypotheses.

The method advantageously further comprises a step of receiving an indication of selection of flight plan and a step of selecting the said at least one of the said at least two flight plans corresponding to the same mission of the said aircraft in response to the said indication of selection of flight plan.

According to a particular embodiment, the method further comprises the following steps, receiving at least one datum for modification of the said at least one flight plan, the said at least one datum for modification being received from the said aircraft;

updating of the said at least one flight plan according to the said at least one received datum for modification;

formatting of the said at least one modified flight plan, the formatted data being an electronic document usable directly by a computer system of the aircraft; and transmitting said formatted data to the said aircraft.

In this way the method according to the invention makes it possible to update the data relating to a flight plan in accordance with the configuration of the systems of the aircraft or to some of its parameters.

The invention also has as its object a computer program comprising instructions adapted for the implementation of each of the steps of the method described above.

The invention likewise has as its object a device comprising means adapted for the implementation of each of the steps of the method described above.

BRIEF DESCRIPTION OF THE DRAWINGS

Other advantages, purposes and features of this invention emerge from the detailed description that follows, given by way of non-limitative example, with reference to the attached drawings in which.

DETAILED DESCRIPTION OF THE INVENTION

The invention applies to a system for aiding in the preparation and the management of missions taking into consideration all the elements linked to the compliance of a flight, in particular the following elements, policy and objectives of the airline company operating the aircraft;

requirements of the air traffic control;

special regulations;

special constraints such as meteorological constraints, traffic constraints and airspace restrictions obtained in particular via NOTAMs; and, reactions to specific events comprising events peculiar to the aircraft (for example fire, an engine failure, a depressurization, an accident involving an individual, a rebellion or the presence of an explosive) and external events (for example a war or a volcanic eruption).

For these purposes, an overall architecture is implemented in order to make it possible in particular to maximize the transfer of data among an operating center, third-party systems and aircraft, in order in particular to optimize the preparation time of the aircraft during which they are on the ground. According to this architecture, each aircraft is considered as an element of a computer network to which the operating center belongs.

This architecture is based on the one hand on flight planning tools and on the other hand on configuration tools of the aircraft manufacturer making it possible to configure and update the software applications of the aircraft and the software tools used by the operating centers.

Figure 2:
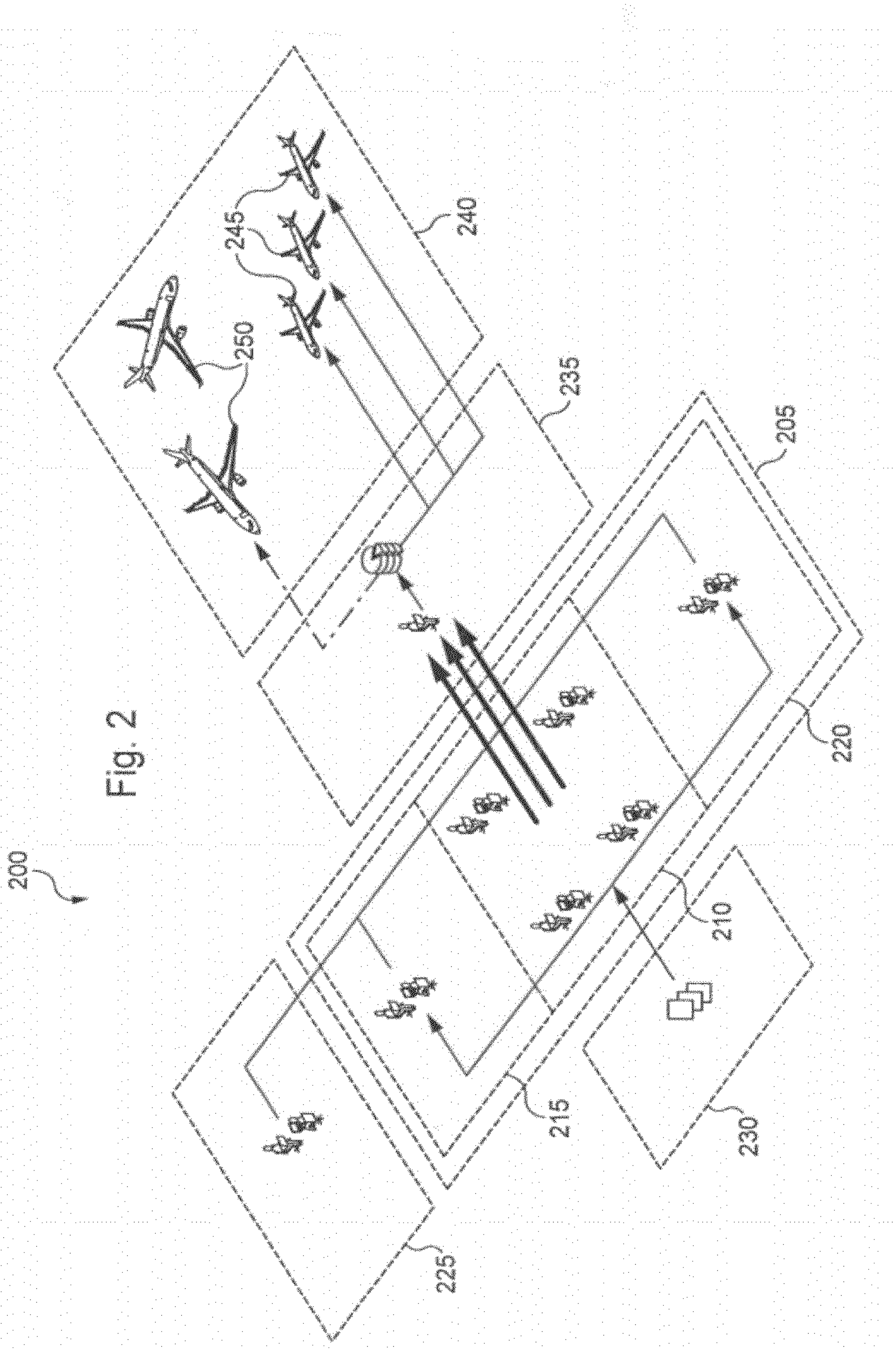
FIG. 2 schematically shows the overall architecture used between the ground and aircraft in order to implement the invention.

FIG. 2 schematically shows the overall architecture used between the ground and aircraft in order to implement the invention. The architecture 200 here is distributed in five different zones referenced 205, 225, 230, 235 and 240.

Zone 205 represents the network of the airline company operating the aircraft. This zone comprises operational control zone 210, maintenance operations zone 215 and cabin operations zone 220.

Maintenance operations in particular have as their object the planning of maintenance operations from the data received from the aircraft (in flight or on the ground) in order to optimize the operation of the aircraft, necessary resources and regular and regulatory inspections as well as the management of spare parts.

Cabin operations relate essentially to management of cleaning and supplying of foodstuffs.

It should be noted here that while the zones 215 and 220 form part of the network of the airline company, the operations performed in these zones can be subcontracted. In this case, zones 215 and 220 do not necessarily belong to zone 205, but preferably are connected to the latter.

Zones 225 and 230 represent all the third-party systems that the network of the airline company accesses in order to prepare and manage its missions.

Zone 225 represents in particular the systems for meteorology and for management/generation of data of NOTAM/AIS (abbreviation for Aeronautical Information Service in English terminology) or aeronautical information service type.

Zone 230 is more specifically associated with the aircraft manufacturer or aircraft manufacturers having produced the aircraft operated by the airline company. As indicated above, the aircraft manufacturer provides the data and the applications making it possible for the airline company to prepare its missions.

Zone 235 has as its object to connect the network of the airline company to the aircraft that it is operating. Advantageously, the data originating from the operating center can be transmitted to the aircraft when the latter are in flight or on the ground (parked or taxiing).

Different modes of communication can be used depending on the situation of the aircraft. It may involve hard-wired communications, for example of the Ethernet type, or wireless using technologies such as WiFi, broadband communications or satellite communications.

Zone 240 represents the aircraft of the airline company, independently of their situation. The aircraft can be on the ground, parked or taxiing, as illustrated by reference 245, or in flight, as shown by reference 250.

Although for reasons of clarity FIG. 2 does not illustrate any safety mechanism, it should be noted that the different zones shown preferably are partitioned off by systems such as fireguards, called firewalls in English terminology.

The data used by the operating center also originate from this operating center itself, closely related systems and third-party systems. These data are processed to prepare and to manage missions, then transmitted to the aircraft in a digital format to allow a direct use of these data by the avionics without its being necessary to reenter them.

Figure 1:
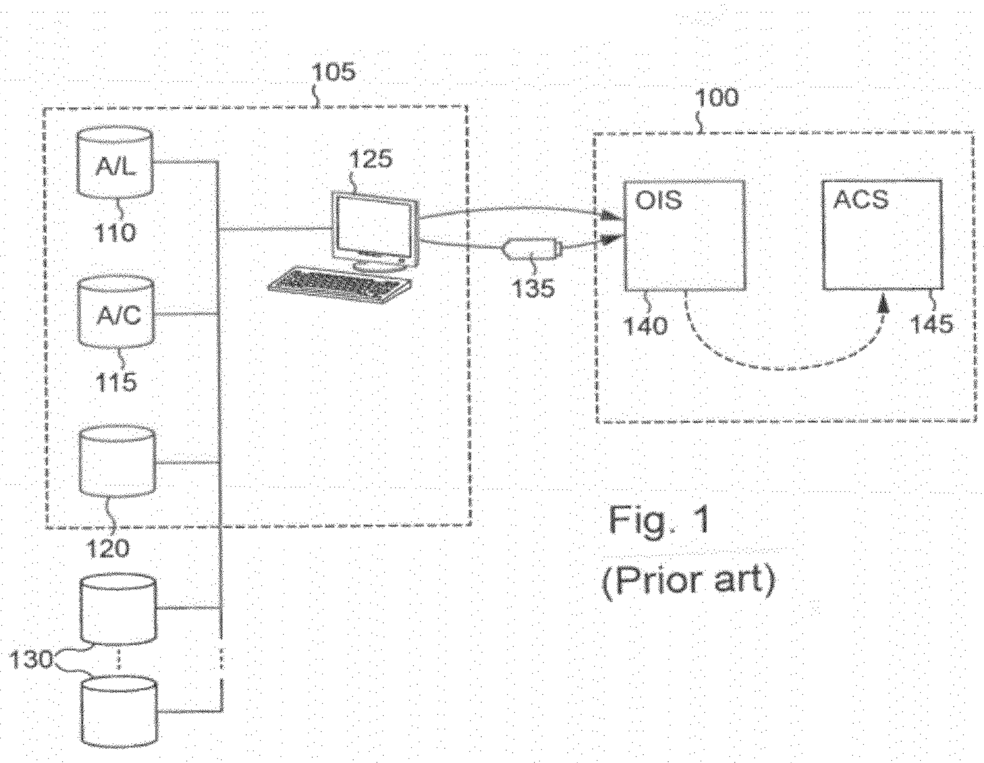
Fig. 1 (Prior art)
FIG. 1 schematically illustrates the preparation of a mission for an aircraft.
Figure 3:
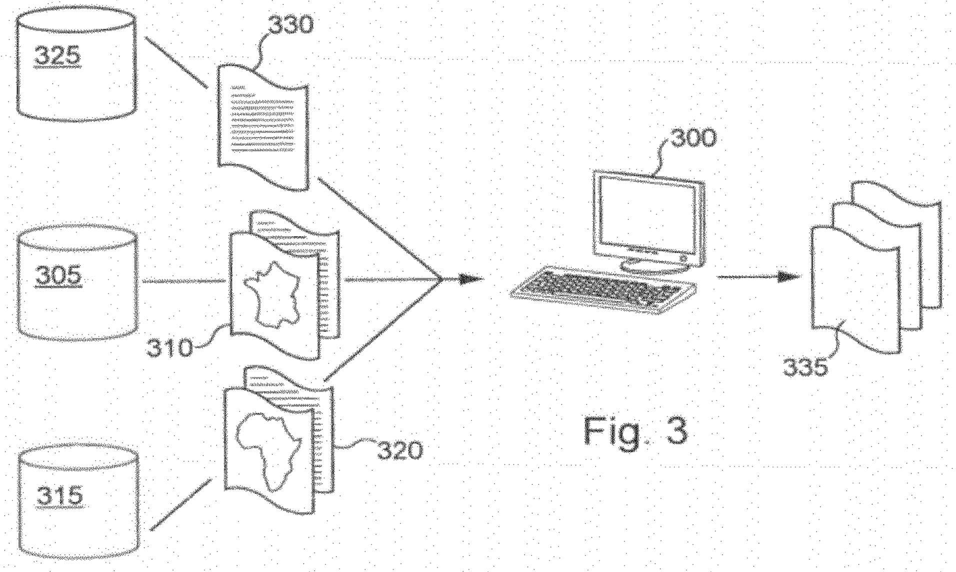
FIG. 3 illustrates an example of simplified data processing performed by an operating center.

FIG. 3 illustrates an example of simplified data processing performed by the operating center. An operating system, comprising the computer system 300, for example a computer, a server or a set of computers and/or server, provided with an application for preparation and management of missions, receives data from several different databases that relate to different types of information.

These data here contain meteorological data received from a database 305, transmitted in electronic form to be able to be used directly. They correspond, for example, to digital charts and to tables referenced 310.

These data also contain flight planning data such as the point and time of departure, the point and time of arrival and the stopovers. These data are received here from a database 315. Again, they are transmitted in directly usable electronic form. They also can correspond to digital charts and to tables referenced 320.

Finally, according to this example, the data comprise decision parameters determined by the airline company operating the aircraft. These parameters represent, for example, an indication relating to the use of the air conditioning during the takeoff phase (stopped by some companies in order to increase the available thrust and/or to reduce wear and tear on the engines). These parameters likewise can relate to instructions for the pilot. In this way, for example, these parameters can aid the pilot in determining the choice that he must make if a problem is encountered in flight and the pilot must decide whether it is advisable to arrive on time while consuming more fuel than anticipated or, on the contrary, to maintain the determined fuel consumption and arrive late. These parameters here are stored in database 325 and are transmitted in directly usable electronic form, for example in the form of text type files.

From data received from the databases 305, 315 and 325, the ground crew, more particularly the flight regulator or dispatcher in English terminology, is able to prepare a flight by using the computer system 300 comprising flight planning applications. According to a particular embodiment, all the flights for the day are prepared for each aircraft.

When the flight or flights have been prepared, the corresponding data are transmitted to the aircraft with the parameters determined according to the policy of the airline company. These data are transmitted in a form directly usable by an avionic system with the appropriate level of safety and security, for example in the form of text file 335.

In order to protect the confidentiality to the transmitted data, so as not to reveal the policy of the airline company, and to ensure the safety of the aircraft, the transmitted data preferably are encoded and signed. The algorithms for encoding, signing, authentication and decoding used by the operating center and the aircraft are, for example, algorithms with public codes such as the RSA algorithm (abbreviation for Rivest Shamir Adleman, authors of this algorithm).

It should be noted that the operating center can not only prepare the next mission or missions but also manage the latter in order to transmit new data to the aircraft, in flight or on the ground, to adapt the missions according to specific events, to look ahead to the end of the missions, and/or to prepare/modify the following missions.

The operating center also has functions for analyzing the parameters of the avionics, in particular the parameters linked to the policy of the airline company, and functions for updating these parameters, subject to their validation by the pilot.

Figure 4:
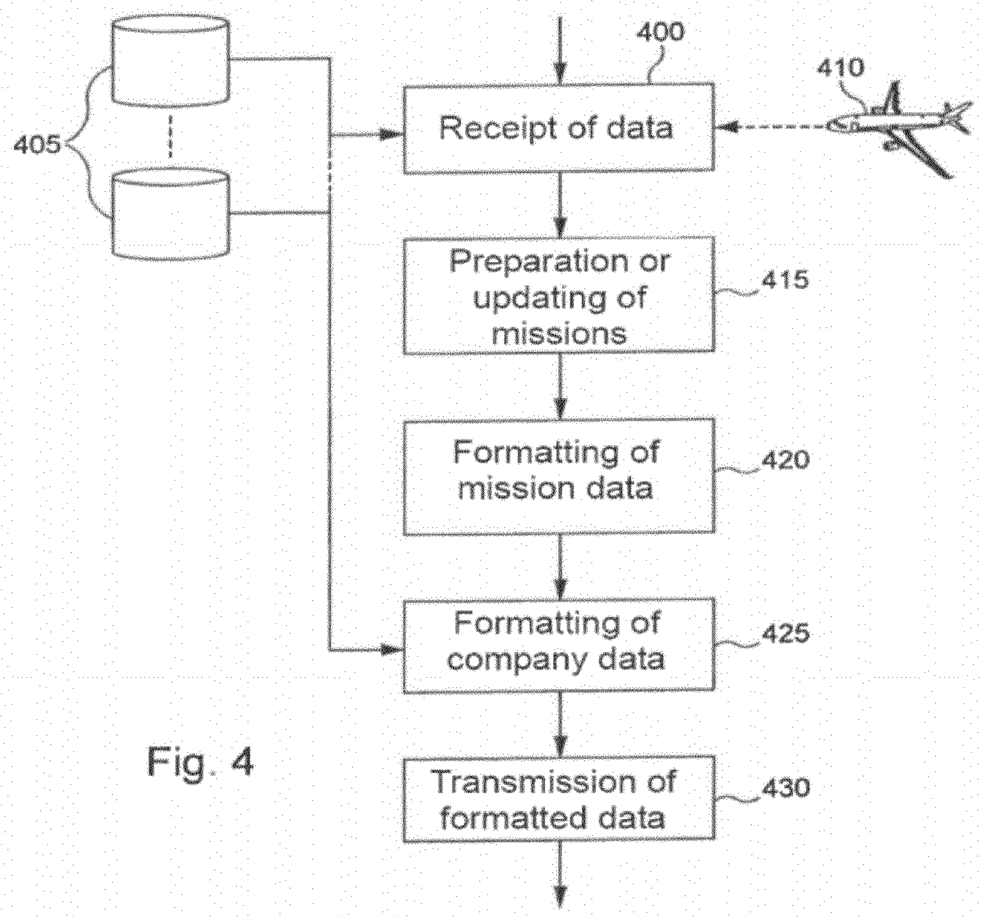
FIG. 4 illustrates an example of an algorithm used by an operating center to prepare or update one or more missions.

FIG. 4 illustrates an exemplary algorithm used by the operating center to prepare or update one or more missions.

A first step (step 400) has as its object receiving of data, in particular data used to prepare or update the mission or missions. The data received here are of the avionic type and of the open-world type, that is, they apply to parameters of the avionics as well as to data originating from systems external to the aircraft and able to be used to determine parameters of the avionics. It should be noted that because of the origin of the data, the confidence level associated with avionic type data is higher than that associated with open-world type data.

Advantageously, several missions are prepared before the corresponding data are transmitted to the aircraft in charge of carrying out these missions. As indicated above, these data originate from several databases, here referenced 405, according to their nature.

Furthermore, as suggested by the dotted-line arrow, certain data can be received from the aircraft 410 in charge of carrying out the prepared mission or missions. These data are, for example, the avionic parameters used by the aircraft. These data can be transmitted regularly by the aircraft to the operating center or at the request of the latter.

A following step (415) applies to the preparation or the updating of the mission or missions. For these purposes, flight management and planning tools are used. The missions are prepared or updated in particular according to the specific parameters of the flight, such as the destination and the nature of the transport, the safety regulations and the operating criteria of the airline company operating the aircraft that is to perform the mission.

The mission data obtained then are formatted (step 420) to be usable directly by a computer system of the aircraft, in particular the avionics. These data make up, for example, one or more text files according to a predetermined structure.

In the same manner, certain operating criteria of the airline company are formatted (step 425) to be transmitted to the aircraft in a directly usable form.

The formatted data then are transmitted to the aircraft in accordance with standard communication means (step 430).

The aircraft have new mission management functions making it possible in particular to exchange data with the operating center, under control of the pilot.

These functions have in particular the object of aiding the pilot in carrying out his missions, improving the missions and the safety of the aircraft as well as the commercial operation of the aircraft. They comprise in particular functions of assistance in the preparation and the updating of missions, functions of diagnosis concerning the ability of the aircraft to carry out a mission and of assistance for making the decision whether or not to carry out a mission, functions of rerouting assistance and functions of systems management.

The functions of assistance in the preparation and the updating of missions have in particular the object of limiting the ground time of an aircraft between two consecutive missions and of reducing the risks of error in entry of the avionic parameters. These functions can be implemented in different ways. According to one particular embodiment, the flight data are received from the operating center and presented, at least partially, to the pilot who can accept them, modifying them if need be, or reject them.

For example, the parameters of mass and balancing as well as the results of performance calculations are displayed on a screen, so that they can be edited, next to a validation button. In this way the pilot can validate the received data or modify them without reentering them systematically. In the same manner, the flight plan can be received from the operating center and presented to the pilot on one or more screens so as to allow him to validate or not validate it, after modifications if need be, to then be used directly by the avionics.

Figure 5:
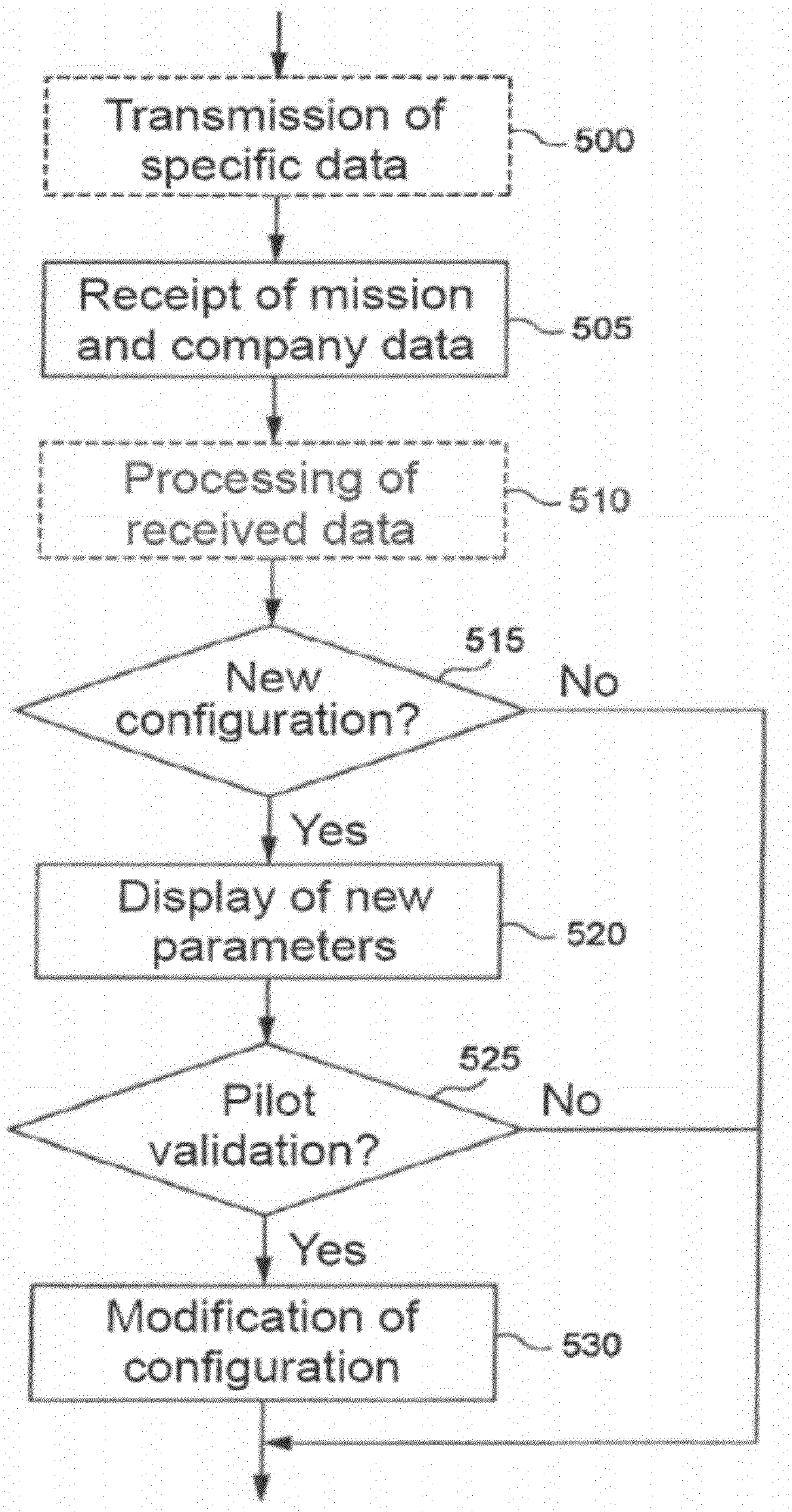
FIG. 5 illustrates an example of an algorithm used in an aircraft to receive mission parameters and to enter them in the avionics; and, FIG. 6 illustrates an example of physical architecture that can be utilized to prepare missions in an operating center or in an aircraft.

FIG. 5 illustrates an exemplary algorithm used in an aircraft to receive mission parameters and enter them in the avionics.

An optional step consists in transmitting to the operating center certain specific data, stored in the aircraft (step 500). These data can be transmitted regularly or at the request of the operating center, the request being able to specify the nature of the data requested. These data are, for example, avionic parameters.

After the transmission of these specific data, or independently, the aircraft receives data sent out by the operating center (step 505). These data, able to be transmitted, for example, in accordance with the algorithm presented with reference to FIG. 4, are received by standard communication means such as those discussed above. The data received here are of the avionic type and of the open-world type.

Depending on their nature, these data can be automatically processed or used to carry out calculations on board the aircraft (step 510). For example, if data allowing the aircraft to carry our performance calculations are involved, these are used on board to accomplish the corresponding calculations such as determination of the takeoff configuration comprising in particular the speed and the aerodynamic takeoff configuration. On the other hand, if avionic parameters processed on the ground are involved, these data are not necessarily processed again on board the aircraft.

The choice of location of the data processing, on the ground or on board the aircraft, can be determined in particular in accordance with the calculation capabilities of the aircraft and/or the communication capabilities between the aircraft and the operating center.

A test then is performed (step 515) to determine whether it is advisable to modify the logic configuration of the systems of the aircraft such as that of avionics. This test can consist, for example, in comparing the data received, processed or not, with corresponding parameters stored beforehand. If it seems advisable to modify the configuration of the aircraft, for example if the data received, processed or not, are different from the corresponding parameters stored beforehand, these data, data representative thereof or data representative of proposed logic configuration modifications of systems of the aircraft are presented to the pilot (step 520), for example in the form of display on a screen in the cockpit.

By way of illustration, if the data received are used for determining the optimal takeoff speed of the aircraft and if this is different from the one stored in the systems of the aircraft, the optimal calculated speed is proposed to the pilot who can validate it or not.

If the pilot validates these data (step 525) that is, accepts the modification of configuration of the aircraft, the configuration is modified accordingly (step 530). The change of configuration of the aircraft can be partial when the pilot validates only a portion of the data received or the representation thereof. The pilot likewise can modify the proposed configuration prior to validating it.

If there is no need to modify the configuration of the aircraft, or if the pilot does not validate the configuration modification, the data received are not made known to the avionics. Nonetheless, they can be stored for informational purposes to be consulted later by the pilot.

During the management of missions, several scenarios can be considered depending on whether the modifications are determined by a computer system of the operating center or of the aircraft.

A first example has as its object the change of the takeoff runway, while a second example relates to a change in trajectory.

According to a first embodiment, the operating center, after having received the load and balancing parameters, can carry out the performance calculations according to the parameters of the airline company. These calculations are carried out here for all the takeoff runways considered. Only the results for the scheduled takeoff runway are transmitted to the avionics of the aircraft. If, during the taxiing phase, a change relating to the takeoff runway occurs, the operating center transmits to the avionics of the aircraft the results calculated beforehand for the new takeoff runway.

In an implementation option, the pilot can indicate to the avionics the runway change such as requested by the traffic control center, the avionics being coordinated automatically with the operating center in order to obtain new data and use them prior to final validation by the pilot.

Alternatively, according to a second embodiment, the performance calculations are carried out directly in the aircraft and taken into consideration by the avionics after validation by the pilot. For these purposes, the operating center manages the parameters specific to the airline company, stored in the aircraft, under the control of the pilot. These calculations here are carried out for all the takeoff runways considered. If a change relating to the takeoff runway occurs during the taxiing phase, the pilot merely changes the reference for the takeoff runway without its being necessary to carry out the performance calculations again.

In an implementation option, if a datum for carrying out a performance calculation is missing, the avionics is coordinated automatically with the operating center in order to obtain the missing datum and to use it in the calculations prior to the final validation by the pilot.

In the same manner, the dispatcher prepares the trajectories for flights by using flight planning tools. The results are transmitted to the aircraft, more particularly to the avionics after validation by the pilot. This transmission preferably takes place when the aircraft are on the ground. If a specific event occurs in flight, for example a storm, the pilot requests a new flight trajectory from the operating center. The dispatcher then determines a new route, satisfying in particular the parameters of safety and the criteria of the airline company, and transmits it to the aircraft. After validation by the pilot, the new data replace the preceding ones. In this way the pilot can benefit from the support of the operating center while retaining control of the flight parameters. In other words, the pilot here has a supervisory role.

Alternatively, the new trajectories can be calculated directly in the aircraft by using data stored beforehand in the aircraft specific to the latter and to the airline company and data received from the operating center, for example meteorological data. When a new trajectory is determined, these parameters are used by the avionics after validation by the pilot. The pilot here has a role of decision-maker and representative of the airline company. In this embodiment, however, the operating center nonetheless advantageously can transmit to the aircraft data specific to the airline company and monitor the data used by the aircraft.

Figure 6:
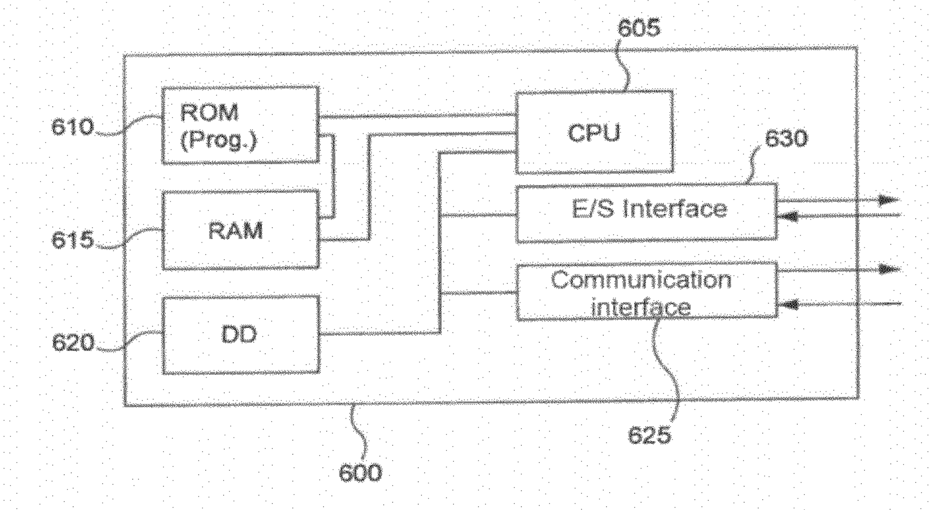

FIG. 6 illustrates an example of physical architecture that can be used to prepare missions in an operating center or in an aircraft. It here comprises a communication bus to which there are connected:

- a central processing unit or microprocessor 605;
- a read-only memory 610 (ROM, acronym for Read Only Memory in English terminology) that can comprise programs to be executed ("Prog");
- a working memory 615 (RAM, acronym for Random Access Memory in English terminology), also called random access memory or cache memory, comprising registers adapted for recording variables and parameters created and modified in the course of execution of the aforesaid programs;
- a mass memory 620 such as a hard disk that can comprise the aforesaid programs "Prog" and data processed or to be processed according to the invention;
- a communication interface 625 adapted for transmitting and receiving data; and,
- an input/output interface 630.

The communication bus permits communication and interoperability among the different elements included in device 600 or connected thereto. The depiction of the bus is not limitative and, in particular, the central unit is capable of communicating instructions to any element of device 600 directly or via another element of device 600.

The executable code of each program permitting the programmable device to implement the processes according to the invention can be stored, for example, on hard disk 620 or in read-only memory 610.

According to another variant, it will be possible for the executable code of the programs to be received at least partly via interface 625, to be stored in a manner identical to that described above.

More generally, it will be possible for the program or programs to be loaded into one of the fixed or removable storage means of device 600 before being executed.

Central unit 605 will control and direct the execution of the instructions or portions of software code of the program or programs according to the invention, which instructions are stored on hard disk 620 or in read-only memory 610 or else in the other aforesaid storage elements. During boot-up, the program or programs that is or are stored in a non-volatile memory, for example hard disk 620 or read-only memory 610, is or are transferred to random access memory 615 which then contains the executable code of the program or programs according to the invention, as well as the registers for storing the variables and parameters necessary for implementation of the invention.

Naturally, to satisfy specific needs, an individual competent in the field of the invention will be able to apply modifications in the foregoing description.

The invention claimed is:

1. A method for an operating center for aiding in preparation and management of missions of an aircraft, the method comprising:

- receiving a plurality of digital data, the plurality of digital data comprising at least one datum of avionic type and one datum of open-world type;
- preparing at least one flight plan from the plurality of data;
- formatting of the at least one prepared flight plan and the at least one datum of open-world type, the formatted data being an electronic document usable directly by a computer system of the aircraft;
- transmitting the formatted data to the aircraft;
- receiving, in the aircraft, the formatted data; and
- after receiving the formatted data, modifying with a computer in the aircraft, parameters of the flight plan in the formatted data.

2. The method according to claim 1, further comprising a step of receiving at least one datum from the aircraft, the at least one received datum being used to prepare the at least one flight plan.

3. The method according to claim 1, wherein a plurality of flight plans is prepared prior to the step of transmitting the formatted data, each flight plan of the plurality of flight plans corresponding to a different mission of the aircraft, the step of formatting comprising the formatting of the plurality of flight plans.

4. The method according to claim 1, wherein a plurality of flight plans is prepared prior to the step of transmitting the formatted data, at least two flight plans of the plurality of flight plans corresponding to the same mission of the aircraft, at least one of the at least two flight plans corresponding to the same mission of the aircraft being formatted and transmitted to the aircraft.

5. The method according to claim 4, further comprising a step of receiving an indication of selection of flight plan and a step of selecting the at least one of the at least two flight plans corresponding to the same mission of the aircraft in response to the indication of selection of the flight plan.

6. The method according to claim 1, further comprising:

receiving at least one datum for modification of the at least one flight plan, the at least one datum for modification being received from the said aircraft;

updating the at least one flight plan according to the said at least one received datum for modification;

formatting the at least one modified flight plan, the formatted data being an electronic document usable directly by the computer system of the aircraft; and transmitting the formatted data to the aircraft.

7. A non-transitory computer-readable storage medium storing instructions which when executed by a processor execute a method for an operating center for aiding in preparation and management of missions of an aircraft, the method comprising:

receiving a plurality of digital data, the plurality of digital data comprising at least one datum of avionic type and one datum of open-world type;

preparing at least one flight plan from the plurality of data;

formatting of the at least one prepared flight plan and the at least one datum of open-world type, the formatted data being an electronic document usable directly by a computer system of the aircraft;

transmitting the formatted data to the aircraft;

receiving, in the aircraft, the formatted data; and after receiving the formatted data, modifying with a computer in the aircraft, parameters of the flight plan in the formatted data.

8. An operating center device configured to aid in preparation and management of missions of an aircraft, the device comprising:

a receiving unit configured to receive a plurality of digital data, the plurality of digital data comprising at least one datum of avionic type and one datum of open-world type;

a preparing unit configured to prepare at least one flight plan from the plurality of data;

a formatting unit configured to format the at least one prepared flight plan and the at least one datum of open-world type, the formatted data being an electronic document usable directly by a computer system of the aircraft; and a transmitting unit configured to transmit the formatted data to the aircraft, wherein a receiving unit in the aircraft receives the formatted data, and after the formatted data is received, a computer in the aircraft modifies parameters of the flight plan in the formatted data.

9. The method according to claim 2, wherein the at least one datum is received from the aircraft regularly.

10. The method according to claim 1, wherein the formatted data is a text file.

* * * * *